No. 770,418. PATENTED SEPT. 20, 1904.
J. R. BROWN.
CULTIVATOR, PLANTER, AND FERTILIZER DISTRIBUTER.
APPLICATION FILED SEPT. 12, 1903.
NO MODEL. 2 SHEETS—SHEET 1.
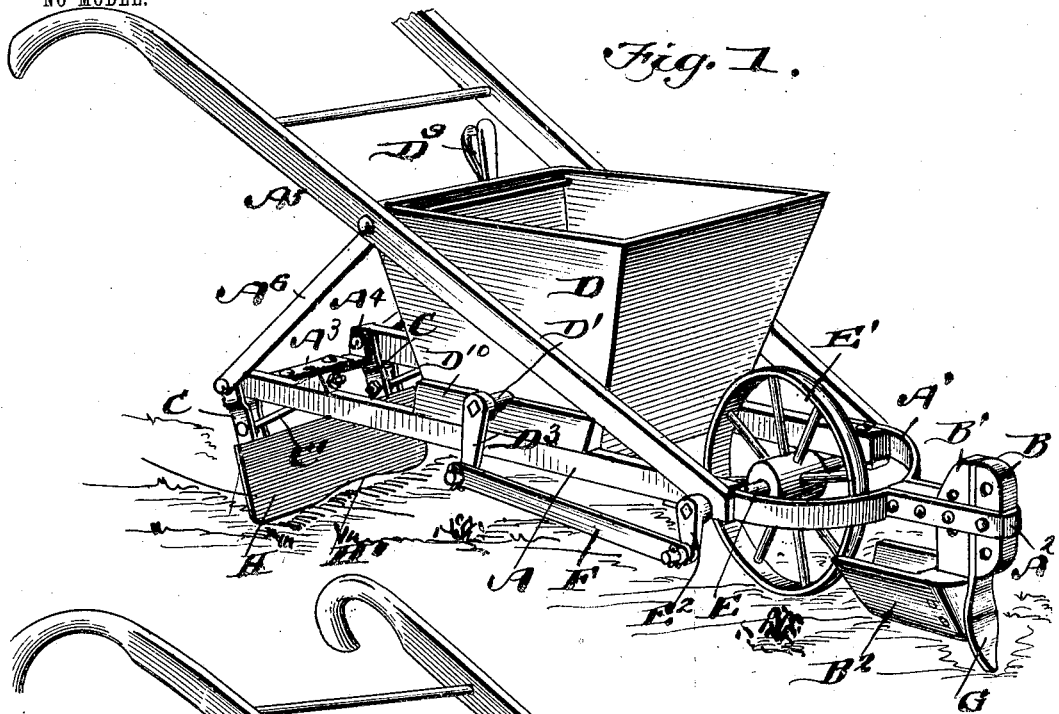
Fig. 1.
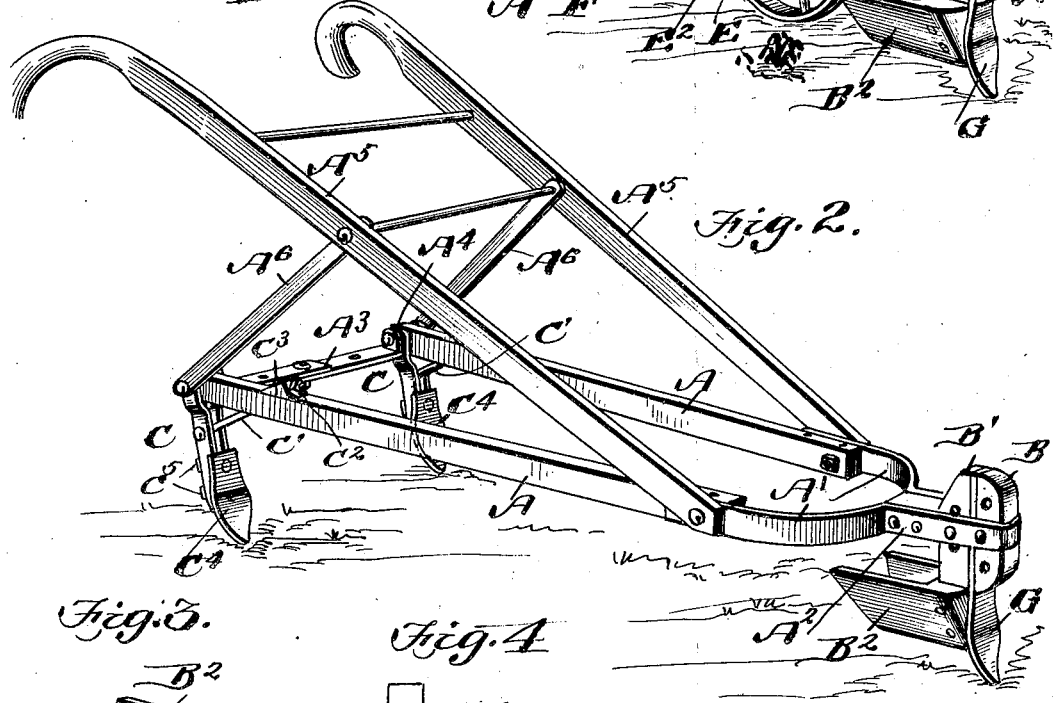
Fig. 2.
Fig. 3.
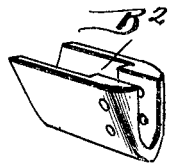
Fig. 4.
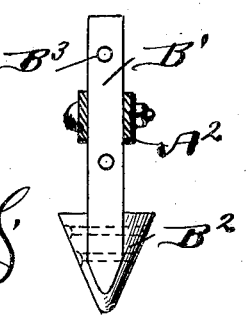
Witnesses
M. D. Blondel
Clarence Shaw
Inventor
James R. Brown,
By Meara & Brock
Attorneys No. 770,418. PATENTED SEPT. 20, 1904.
J. R. BROWN.
CULTIVATOR, PLANTER, AND FERTILIZER DISTRIBUTER.
APPLICATION FILED SEPT. 12, 1903.
NO MODEL. 2 SHEETS—SHEET 2.
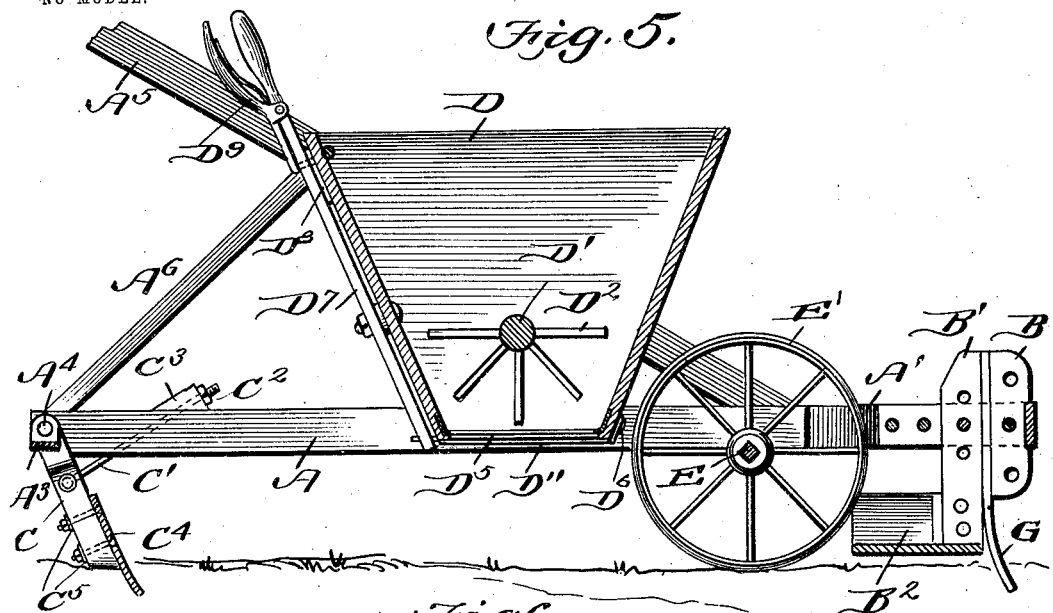
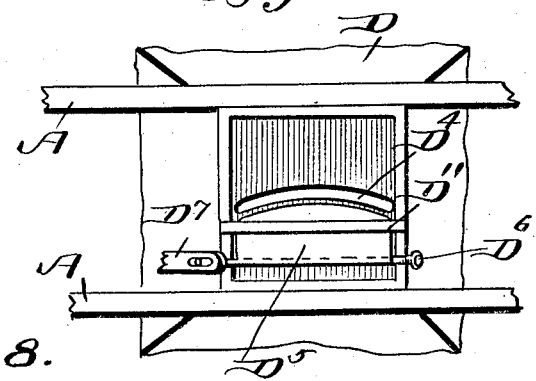
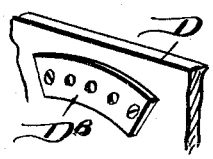
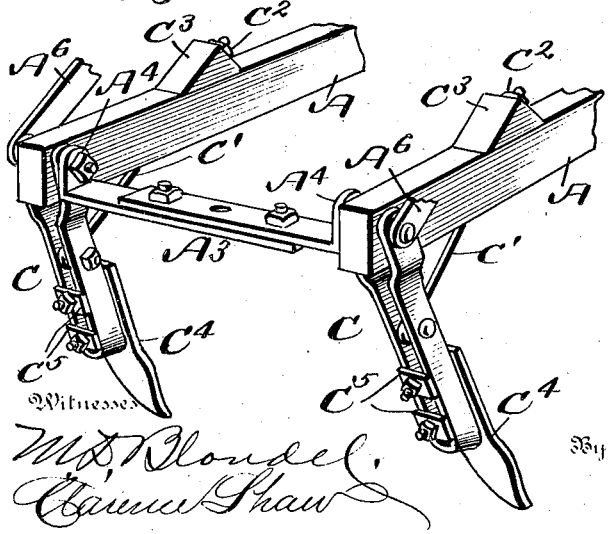
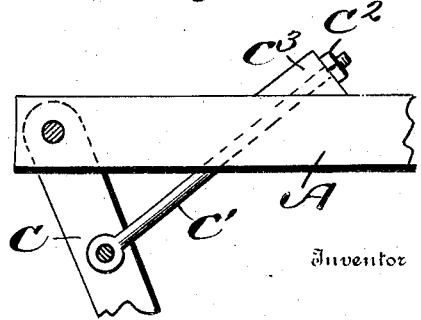

No. 770,418.                                   Patented September 20, 1904.

UNITED STATES PATENT OFFICE.

JAMES REDIN BROWN, OF MOULTRIE, GEORGIA.

CULTIVATOR, PLANTER, AND FERTILIZER-DISTRIBUTER.

SPECIFICATION forming part of Letters Patent No. 770,418, dated September 20, 1904.

Application filed September 12, 1903. Serial No. 172,941. (No model.)

*To all whom it may concern:*

Be it known that I, JAMES REDIN BROWN, a citizen of the United States, residing at Moultrie, in the county of Colquitt and State of Georgia, have invented a new and useful Cultivator, Planter, and Fertilizer-Distributer, of which the following is a specification.

My invention is a combined cultivator-frame and planter, the hopper of the planter being adapted to distribute fertilizer as well as seed, and the cultivator-frame is adapted for use either with or without the hopper.

The object of the invention is the combination of parts adapted to be used either as a cultivator, as a cotton-planter, or as a distributer of fertilizer, thereby effecting a saving to the farmer by combining the three devices in one. This combination is effected in the main by peculiar construction of the frame.

My invention consists of the novel features of construction and combination of parts hereinafter described, particularly pointed out in the claims, and shown in the accompanying drawings, in which —

Figure 1 is a perspective view of my device, all the parts being assembled. Fig. 2 is a perspective view of the frame, the hopper and other parts being removed to more clearly show its construction. Fig. 3 is a perspective view of the drag-block. Fig. 4 is a front view of the drag-block, the frame being shown in section. Fig. 5 is a longitudinal section through my device, the wheel being in elevation. Fig. 6 is a plan view of the bottom of the hopper. Fig. 7 is a detail view of a plate arranged on the rear of the hopper. Fig. 8 is a perspective view of the rear end of the frame. Fig. 9 is a side elevation of the rear portion of the frame, showing the means for adjusting the cultivator points or shovels.

In constructing my improved cultivator and planter frame I employ a substantially rectangular frame comprising the side pieces A, connected at their front ends by a spring-metal bow-shaped member A', the bow portion of which carries a horizontal forwardly-extending loop portion $A^2$, the sides of which are perforated. The rear end piece $A^3$ is composed of two flat metal bars perforated and adapted the one to slide on the other. The inner ends of these bars overlap, and the outer ends are bent upward and bolted to the side members A, as shown at $A^4$. The inner sliding overlapping ends are held together by a suitable bolt adapted to pass through the alining perforations formed in the bars. Handles $A^5$ are connected at their lower front ends to the side members A and are supported by suitable brace-bars $A^6$, which are connected at their lower ends to the rear portions of the side members, and the handle also has the customary cross brace-rods. Two blocks B and B' fit in the loop $A^2$ and are vertically adjustable therein, the blocks being transversely perforated, and by moving the blocks vertically such perforations are brought into alinement with the perforations in the sides of the loop and are held in place by suitable bolts passing through the perforations. The rear block B' extends lower down than the block B, being longer, and at its lower end it fits into and is bolted to a drag-block or smoother $B^2$. This latter block is centrally cut out to lighten it and has a smooth curved under surface, which runs in the furrow made by the shovel or cultivator point G and prevents the earth from falling back into the furrow and filling same up. As the drag-block is bolted to the adjustable block B', it can be adjusted vertically by adjusting the latter-mentioned block.

Depending standards C are pivotally connected to the side members A adjacent the rear ends of the latter. Brace-rods C' pass diagonally downward through the side members A in advance of the standards C, the lower ends of the brace-rods C' being pivotally connected to the standards at points below the side members A. These brace-rods C' pass loosely through the side members A and have threaded upwardly-projecting portions, the brace-rods C' also passing loosely through stop-blocks $C^3$, carried by the side members A, and suitable nuts $C^2$ work upon the threaded portions of the rods and bear on the upper faces of the stop-blocks $C^3$. The brace-rods C' are obviously adjustable and may be locked in their adjusted position by means of the nuts $C^2$, whereby rearward movement of the standards C is limited, there being no tendency to a forward movement when the device is in use. Suitable cultivator points or shovels $C^4$ are secured to the lower end portions of the standards C by means of suitable bolts and nuts.

The hopper D has the usual converging walls, and its lower portion rests between the side members A, being supported by the side strips $D^{10}$, secured to the sides of the hopper. A shaft $D'$ is arranged transversely in the lower portion of the hopper and carries agitator-fingers $D^2$. A shaft or axle E is arranged transversely in the bow portion of the frame, and a wheel $E'$ is fixed thereon. At one end the shaft E is squared, and a crank-hanger fits over said squared portion. A projecting end of the shaft $D'$ also carries a crank-hanger $D^3$, longer than the hanger $E^2$, and these hangers are connected by a pivoted connecting-link F. In the bottom of the hopper is formed a curved slot $D^4$, and a sliding plate $D^5$ is adapted to close this slot and works beneath a suitable guide-bar $D^{11}$. At each end the plate has a corner-lug, one of which is pivoted at $D^6$ to the hopper and the other to the lower slotted end of the lever $D^7$. A plate $D^8$, having perforations formed therein on the line of the arc described by the lever, is secured to the rear of the hopper, and the lever $D^7$ when moved swings over said plate. A suitable spring-pressed locking-grip $D^9$ is pivoted to the upper end of the lever, the lower end of the grip carrying a pin, which is adapted to engage one of the perforations in the plate $D^8$ and lock the lever, and consequently the sliding plate, against movement.

A cultivator point or shovel G is wedged in between the blocks B B' and held by pressure of the blocks or may be held by flat end bolts passed through the block B', through apertures $B^3$, and engaging perforations (not shown) in the shank of the cultivator-point. The standards C are also adapted to carry a covering-board H, the lower edge of which is centrally and inwardly curved, as at H', and is adapted to cover the seed deposited in the furrow opened by the point or shovel G.

The operation of my device will be obvious. When the hopper is in place, rotation of the axle E will cause a rocking movement of the shaft $D'$ through the medium of the crank-hangers and connecting-link F. The agitator-fingers $D^2$ will prevent the seed or fertilizer from massing or caking in the bottom of the hopper, and the lever $D^7$ can be shifted, so as to regulate the feed, by partly closing or entirely uncovering the slot $D^4$. By adjusting the end piece $A^3$ the rear ends of the side members can be either forced farther apart or drawn closer together, thus regulating the distance between the points or shovels $C^4$. The points can also be adjusted by raising or lowering the standards C by means of the threaded rod $C'$ and nuts $C^2$. The point G can be adjusted by raising the blocks between which it is held, and the drag can also be set so as to work higher or lower with reference to the point. The frame can be used as a cultivator without the hopper, the hopper and parts attached thereto being removable.

It will be seen from the above that I have a frame well devised for the purposes intended and that the device as a whole can be adjusted to accommodate itself to almost every requirement of any work that it is likely to be called on to perform.

Having thus fully described my invention, what I claim as new, and desire to secure by Letters Patent, is—

1. The combination with a frame having a forwardly-extending loop portion, of vertically-adjustable blocks arranged in said loop portion, a cultivator-point shank held between said blocks, the rear block being reduced at its lower end, and a wedge-shaped drag-block having a smooth curved under surface secured thereto, the lower reduced end portion of the rear block fitting in the recess formed in the drag-block.

2. A device of the kind described comprising a frame, a hopper arranged on the frame, parallel blocks arranged vertically at the forward end of the frame and adapted to clamp between them the shank of a cultivator-point, a drag having a curved under surface secured to the rearmost block, and a covering-board carried by the frame to the rear of the hopper and at a right angle to the drag, said covering-board having its lower edge cut away in alinement with the said drag, as and for the purpose set forth.

JAMES REDIN BROWN.

Witnesses:
J. F. MONK,
G. W. HOOKER.